United States Patent Office 3,707,388
Patented Dec. 26, 1972

3,707,388
ASPHALTIC COMPOSITIONS
Robert N. Kinnaird, Jr., Yonkers, N.Y., assignor to Mobil Oil Corporation
No Drawing. Continuation of application Ser. No. 793,616, Jan. 23, 1969, which is a continuation-in-part of application Ser. No. 468,127, June 29, 1965, both now abandoned. This application Jan. 18, 1971, Ser. No. 107,438
Int. Cl. C08h *13/00;* C09d *3/24*
U.S. Cl. 106—273
4 Claims

ABSTRACT OF THE DISCLOSURE

Asphaltic compositions are provided which are obtained by polymerizing a charge-stock comprising a petroleum asphalt, derived from the thermal processing of petroleum hydrocarbons, having a specific gravity of at least about 1.1 and a benzene-insolubles content from about 0 to about 12 percent by weight, in the presence of oxygen at a rate from about 0.4 c.f.m./bbl. to about 2.7 c.f.m./bbl. and at a temperature in the range from about 700° F. to about 850° F. A finished petroleum asphalt is produced having increased specific gravity and a benzene-insolubles content from about 15 to about 35 percent by weight, and can be employed as a binder for carbon particles in electrodes.

Cross-reference to related applications

This application is a continuation of application Ser. No. 793,616, filed, Jan. 23, 1969, which is a continuation-in-part of application Ser. No. 468,127, June 29, 1965, both abandoned.

BACKGROUND OF THE INVENTION (1) Field of the invention

This invention relates to improved asphaltic compositions, and, in one of its aspects, relates more particularly to improved asphaltic compositions suitable for use as binders in the manufacture of molded carbonaceous articles. Still more particularly in this aspect, the invention relates to the production of improved asphaltic compositions in the form of a pitch, suitable for use as a binder in the manufacture of molded carbonaceous articles, such as carbon electrodes.

(2) Description of the prior art

In the manufacture of molded carbonaceous materials, such as the aforementioned carbon electrodes, calcined coke is generally employed as the starting material. Inasmuch as the coke possesses no natural adhesiveness, it must be bound together, in the desired shape, with a compatible material. Thus, for example, in the manufacture of carbon electrodes, the coke is usually ground, mixed with a binder, molded and then baked to carbonize the binder. Binders employed for these purposes, must be sufficiently fluid at the temperatures at which they are mixed with the solid coke in order to completely wet and penetrate the latter. Furthermore, the binder should have a relatively stable viscosity when subjected to temperatures as high as about 200° C. By reason of these stringent requirements, commercially employed pitch binders have been made, almost exclusively, from selected coal-tar products.

Binders, employed in the production of molded carbonaceous articles, particularly carbon electrodes, should, in general, comprise a stable hydrocarbon mixture of uniform consistency and quality, and should be substantially free from contaminants. Among the contaminants which have heretofore prevented the use of petroleum-derived pitch in carbonaceous articles, are coke-like materials. The term "coke" or "coke-like materials," as employed herein, denotes a hydrocarbon having a carbon to hydrogen atomic ratio of about 2.0 or higher, and is, generally, produced as a result of excessive polymerization and condensation reactions, which are necessary for obtaining a pitch binder having the desired properties. A satisfactory pitch binder, suitable for use in the manufacture of carbon electrodes, can hold in stable suspension only about 2.5 weight percent of coke-like materials. At coke concentrations greater than about 2.5 weight percent, it is found that the excess coke-like material tends to agglomerate and to separate from the pitch, producing a non-uniform product, and providing a non-uniform binder. This coke-like material has been found to have poor binding properties, and does not contribute to the desired characteristics of the finished product. The presence of excess coke in petroleum-derived pitch, therefore, is one of the main factors in decreasing bonding characteristics, of the binder pitch, resulting in migration during baking treatment of carbon electrodes, and leaving areas of un-bonded carbon in the finished article. In this condition, a carbon electrode, employing a petroleum pitch binder, is produced having uneven mechanical strength, and is variable in conductivity. Another important requisite is that the binder material possess a relatively high benzene-insolubles content so that an electrode material of relatively higher density may be produced. For these reasons, petroleum pitches have heretofore not been considered as satisfactory binders, since they fail to meet the stringent requirements of commercially desirable pitch binders. Thus, commercial pitch binders have heretofore been produced, almost exclusively, from coal tar. Moreover, in some applications, the presence of excessive sulfur in the aforementioned electrodes, causes deleterious effects during ore reduction. The low sulfur-content of the charge-stock employed in the present invention is another advantage to be realized.

The prior art, contemplates a method for preparing a pitch binder from petroleum-derived hydrocarbons. This method comprises thermally cracking a high-boiling hydrocarbon fraction, and passing the hot cycle residue into a soaking tank of substantial capacity and maintained under super-atmospheric pressure. The flow of the cycle residue is regulated through the soaking tank, so that the residence time for any given increment of feed-stock ranges from about 3 to about 5 hours. The initial pitch thus produced is not considered satisfactory and is recycled through the soaking tank to improve its quality. However, over an extended soaking time period, an excessive amount of coke-like material is produced in the upgrading of the pitch product, while some of the excess coke separates and tends to accumulate at the bottom of the soaking tank. This condition, therefore, requires an extensive cleaning operation to remove undesired accumulated coke. In addition, the excess coke thus produced, contaminates the pitch product and provides the undesirable characteristics of a non-uniform pitch binder, as hereinbefore described. Furthermore, the extended soaking operation of the prior art, as employed on a commercial basis, is found to be time consuming and expensive for improving the quality of the pitch binder. Thus, prior to the present invention, the preparation of pitch binders from petroleum hydrocarbons obtained by the thermal cracking of high boiling petroleum hydrocarbon fractions, has not proved to be commercially attractive.

SUMMARY OF THE INVENTION

In accordance with the present invention, as more fully hereinafter described, an improved asphaltic composition is provided by polymerizing a charge stock comprising a petroleum asphalt, derived from the thermal processing of petroleum hydrocarbons, having a specific gravity of at least about 1.1, and a benzene-insolubles content from about 0 to about 12 percent, by weight, in the presence of oxygen, at a rate from about 0.4 c.f.m./bbl. to about 2.7 c.f.m./bbl., and at a temperature in the range from about 700° F. to about 850° F., for a time sufficient to produce a petroleum asphalt of increased specific gravity and a benzene-insolubles content from about 15 to about 35 percent by weight.

Prior to the present invention, binder pitch has been produced by heat-soaking of the aforementioned thermal asphalts for relatively long periods of time (e.g., up to 5 hours) at temperatures of the order of about 800° F., on a batch basis; or on a continuous basis, by carrying out the heat operation for relatively shorter periods, but at relatively higher temperatures, e.g., of the order of about 975° F. On a comparative basis, the improved asphaltic compositions of the present invention are prepared by carrying out the heat treatment in the presence of oxygen, e.g., air or other oxygen source. This introduction of oxygen into the reaction, results in a polymerization mechanism, in which the oxygen reacts with hydrogen present in the asphalt, to produce water, and adds heat values to the system at a molecular level, where it is most beneficial, and also results in removing undesirable reaction products. In essence, the ability to utilize oxygen in the heat treatment, makes possible the utilization of significantly lower heat-soaking temperatures, namely, below the autogenous ignition temperature of the asphalt (which is about 850° F.), than have heretofore been employed in conventional heat-soaking operations, where the thermal asphalt was heat-soaked at temperatures in excess of about 1000° F., and even as high as on the order of about 1100° F., but in the absence of oxygen. In accordance with the present process, the aforementioned polymerization treatment results in upgrading a petroleum asphalt having a specific gravity of at least about 1.1 to asphalts of significantly higher, and far more desirable, specific gravities, for example, of the order of about 1.25. Another important feature of such polymerization treatment is that a charge-stock, comprising a petroleum asphalt derived from the aforementioned thermal processing of petroleum hydrocarbons, having a benzene-insolubles content of from about 0 to about 12 percent by weight can be upgraded to result in a finished asphalt having a benzene-insolubles content of from about 15 to about 35 percent, by weight, whereby such asphalt product may be employed as a binder in producing high density carbon electrodes. In a preferred application, the petroleum asphalt charge-stock having a benzene-insolubles content of from about 0 to about 1 percent by weight can be treated to produce a finished asphalt having a benzene-insolubles content of from about 20 to about 30 percent by weight.

As previously indicated, the improved asphalt compositions of the present invention are prepared from asphalts derived from the thermal processing of petroleum hydrocarbons. Such petroleum hydrocarbons, particularly contemplated, are those employed in the manufacture of gasolines. Thus, the raw asphalt which is treated in accordance with the processes of the present invention may comprise, e.g., as a charge-stock, aromatic residues such as are obtained in the thermal processing of straight-run petroleum fractions in the manufacture of gasolines, preferably boiling from about 400° F. to about 1200° F. More specifically, as illustrative of the aforementioned charge-stocks, the latter may comprise a blend of still-tower bottoms from conventional Thermofor catalytic processes.

The thermal processing of petroleum hydrocarbons having a specific gravity of at least about 1.1, in the presence of oxygen, and a benzene-insolubles content of from about 0 to about 12 percent, by weight, as previously indicated, is carried out at a temperature in the range from about 700° F. to about 850° F. Preferably, this heat treatment is carried out at a temperature between about 750° F. and about 800° F. In this respect, it was found that increasing the temperature above about 750° F., results in an increase of the specific gravity level, but at a much faster rate. On the other hand, it was found that increasing the temperature above about 750° F. has very little effect on the benzene insoluble fraction of the product, and remains essentially constant, particularly at processing temperatures between about 750° F. and about 800° F. The sulfur level of the product, was found to depend primarily on the amount of distillate which was formed during the reaction. Thus, it was found, that the sulfur level of the binder pitch dropped from an initial value of 1.3% to 1.2%, when the reaction temperature was maintained at about 750° F. or higher.

In accordance with the aforementioned thermal treatment, it was found that as the softening point of the pitch increases, the specific gravity also increases at approximately a linear rate. The smallest increase was found to occur when the products are made by distillation. The greatest increase, on the other hand, was found to have been obtained at the highest blowing temperature. Thus, it was found that as the temperature increases, the specific gravity increases at an accelerating rate. Below about 700° F., the increase in specific gravity per 1° F. increase in softening point, occurs at a relatively slow rate. Above about 700° F., this increase occurs at a much faster rate. Illustratively, based on the specific gravity requirements of the binder pitch, it was found that a minimum temperature of 740° F. is required to produce a 230/240° F. softening point binder pitch.

In carrying out the aforementioned thermal processing reaction, it was found that the benzene insoluble material forms rapidly by reason of oxygen being present in the reaction. After a softening point of approximately 150° F. has been reached, the increase in benzene insoluble material is found to be approximately linear, with the increase in softening point. The levels, thus obtained, are found to be higher as the reaction temperature increases from 500° F. to approximately 700° F. Between about 750° F. and about 775° F., the benzene insoluble level drops somewhat, but the rate of increase remains high. When carrying out the thermal processing at temperatures from about 740° F. to about 780° F., the 20% benzene insoluble level is reached for products having a softening point of about 230° F.

Concomitant with the observations with respect to the specific gravity, it is found that the Conradson Carbon increases as the reaction temperature increases. Values within the same range as those normally obtained for satisfactory binder pitches, are obtained when the processing temperature is preferably at least about 740° F. or higher.

The viscosity of the binder pitch produced in accordance with the thermal processing reaction of the present invention, is found to be somewhat higher than that obtained for thermal asphalts having the same softening point. Thus, it was found that the highest viscosity levels are obtained when the processing temperature is maintained at about 700° F. or lower. No significant shift in the viscosity level was observed with respect to small changes in the operating temperature conditions when maintained at the level between about 740° F. and about 780° F. Insofar as residence time is concerned, it is found that this factor is dependent upon both the processing temperature and the quantity of oxygen consumed. Thus, at any given temperature, the required residence time, will depend upon the oxygen consumption rate. As the temperature is increased, the oxygen requirement is decreased. Thus, illustratively, approximately 130 cubic feet of oxygen per barrel is required to obtain a binder having a softening point of approximately 230° F. In general, oxygen is supplied to the reaction at a rate from about 0.4 c.f.m./bbl. to about 2.7 c.f.m./bbl. Insofar as the source of oxygen is concerned, for use in the above-described thermal processing polymerization reaction, any source may be employed which makes available free oxygen for the above purpose Thus, the source of oxygen may comprise, for example, air, free oxygen and various materials which have the ability to liberate oxygen during the processing operation, for example, organic and inorganic peroxides.

DESCRIPTION OF SPECIFIC EMBODIMENTS

The following examples, and data, are intended to illustrate the preparation of the improved asphaltic compositions of the present invention and their properties. In the runs, hereinafter described, a 97° F. softening point, Augusta thermal asphalt for use as a binder pitch feed stock was employed. Table I below shows the properties of this material.

TABLE I

97° F. softening point thermal asphalt

| | |
|---|---|
| Specific gravity, 77/77° F. | 1.155 |
| Softening point, R & B, ° F. | 97 |
| Benzene insolubles, percent wt. | 0.29 |
| Conradson carbon, percent wt. | 21.7 |
| Sulfur | 1.29 |
| Viscosity, 210° F., SFS/cks. | 75/157 |
| Viscosity, 250° F., SFS/cks. | 19/40 |

All of the runs, hereinafter described, were made in one-gallon blowing units, with an initial charge of 10 pounds. Six samples, of about one pound per sample, were taken during these runs at approximately equal intervals. The properties of these samples were determined so that the change in properties could be observed during the processing of the material. Nine runs were made at various temperature levels between 500° F. (which is the conventional air blowing temperature employed in operations of this type) and 780° F. The operating conditions, and estimated yields of these runs, are shown in the examples of Table II.

TABLE II.—OPERATING CONDITIONS

[Blowing of 97° F. softening point thermal asphalts]

| Ex. No. | Temperature ° F. | Oxygen rate (c.f.m.) | Intitial rate (c.f.m./bbl.) | Charge (lbs.) | Computed yield (percent) | CF-O₂/bbl. required for 230 S.P. |
|---|---|---|---|---|---|---|
| 1 | 500 | 1.3 | .91 | 10 | 97 | 275 |
| 2 | 600 | 1.3 | .91 | 10 | | |
| 3 | 700 | 1.3 | .91 | 10 | | |
| 4 | 740 | 1.3 | .91 | 10 | | |
| 5 | 750 | 1.3 | .91 | 10 | | |
| 6 | 760 | 1.3 | .91 | 10 | 69 | 158 |
| 7 | 775 | 0.89 | .59 | 10 | 68 | 118 |
| 8 | 780 | 0.89 | .59 | 10 | 67 | 134 |
| 9 | 500 | 1.3 | .91 | 10 | | ¹ 100 |

¹ 130 S.P. flux, Mexican residuum for comparison.

The condensate obtained from the run of Example 8, was examined, and its properties are shown in Table III.

TABLE III

Condensate from Example 8

| | |
|---|---|
| Specific gravity at 60/60° F. | 1.044 |
| Distillation, vacuum | |
|   I.B.P., ° F., corrected | 396 |
|   10% ° F., corrected | 522 |
|   50% ° F., corrected | 653 |
|   90% ° F., corrected | 787 |
| Sulfur, percent wt. | 1.41 |

From Table III, above, it will be noted that the condensate reveals a higher sulfur content than that of the base stock. Correspondingly, therefore, the resulting binder pitch will have a lower sulfur content than the charge stock. The reduction in sulfur content, by the process of the present invention, is approximately equal to that obtained by heretofore conventional heat soaking operations. It will also be noted that the aforementioned condensate has a much lower specific gravity than the vacuum distillate from the base stock, indicating that the major portion of the condensate results from the cracking of the base stock. The specific gravity of this condensate and that of the distillate from the charge stock, are compared in Table IV, below.

TABLE IV.—SPECIFIC GRAVITY OF DISTILLATES

| | | |
|---|---|---|
| Condensate | At 60/60° F. | 1.004 |
| Distillate: | | |
|   10% | At 60/60° F. | 1.085 |
|   20% | At 60/60° F. | 1.090 |
|   30% | At 60/60° F. | 1.095 |
|   40% | At 60/60° F. | 1.100 |

Based upon the change in specific gravity of the binder pitch and the sum of the condensate and losses, the theoretical specific gravity of the volatile matter is less than 1.00, indicative of the fact that the non-recovered vapors are relatively light. The loss represents the non-condensable material and the condensable material which is lost through mechanical apparatus associated with the processing of the operation.

The analytical results obtained on binder pitches having a softening point of about 200° F. or higher from the aforementioned runs shown in Examples 1 through 8 of Table II, above, are illustrated in Table V below. For comparative purposes, the properties of the charge stock and a 60% bottoms from distillation are recited. The properties of the plant run of conventional heat-soaked pitch, are also shown for comparative purposes.

TABLE V.—PROPERTIES OF BLOWN THERMAL ASPHALTS

| Example Number | | | 1 | 2 | 3 | 4 | 5 | 6 | 7 | 8 | Plant run |
|---|---|---|---|---|---|---|---|---|---|---|---|
| Blowing temp., ° F. | Charge | Dist. | 500 | 600 | 700 | 740 | 750 | 760 | 775 | 780 | 1,000 |
| Softening point, R&B, ° F. | 97 | 208 | 250 | 237 | 233 | 242 | 226 | 227 | 202 | 238 | 242 |
| Specific gravity at 77/77° F. | 1.155 | 1.191 | 1.220 | 1.221 | 1.232 | ¹1.245 | 1.241 | 1.244 | 1.234 | 1.268 | 1.260 |
| Flash point, COC, ° F. | 455 | | 520 | | 520 | 580 | 520 | 585 | 515 | | 560 |
| Conradson carbon, wt. percent | 21.7 | 37.6 | 42.2 | 42.1 | 45.6 | 46.9 | 47.8 | 48.5 | 44.5 | 52.9 | 5293 |
| Viscosity, 350° F., SFS | | 35.5 | 946 | 748 | 430 | 355 | 184 | 272 | 67 | 565 | 660 |
| Viscosity, 350° F., cks. | ¹5.58 | 74.7 | 1,986 | 1,570 | 903 | 747 | 387 | 578 | 140 | 1,188 | 1,386 |
| Benzene insol., wt. percent | 0.29 | 0.97 | 18.4 | 19.6 | 22.3 | | 18.9 | 18.2 | 13.9 | 21.6 | 19.8 |
| Quinoline insol., wt. percent | | | 0.02 | Nil | 0.19 | Nil | 0.21 | 0.01 | | 1.2 | 2.2 |
| Sulfur, wt. percent | 1.29 | 1.01 | 1.20 | 1.29 | 1.19 | 1.14 | 1.22 | 1.20 | 1.19 | 1.07 | 1.08 |

¹ Computed values.

The oxygen requirement for the aforementioned improved process of the present invention, is found to decrease as the processing temperature is increased. The reaction time, required for carrying out the polymerization treatment, is dependent upon the quantity of oxygen used per unit time per barrel. In this respect, complete utilization of the oxygen was found to be obtained up to the 200° F. softening point level, and a maximum oxygen concentration of 4%, was obtained at a softening point of 238° F. In this connection, in accordance with a laboratory operation, a constant air rate of 2 l.p.m. and 3 l.p.m. was employed. Such use introduced a variable air feed rate of 2 l.p.m./4.5 kg. to 3 l.p.m./1.5 kg. This was found to correspond to 2.85 c.f.m./bbl. to 12.8 c.f.m./bbl. In actual commercial plant operation, it is found that an air feed rate of 2 c.f.m./bbl. is satisfactory, and if the same degree of efficiency is to be attained, the required residence time is about five hours. If higher air feed rates are to be employed, shorter residence times are obtained if the oxygen utilization level is maintained. In this respect, it was found that approximately 120 cf. of oxygen to 140 cf. of oxygen per barrel, is required to produce a 230° F. softening point binder pitch at the 760–780° F. processing temperature level. Additional data indicate that as little as about 60 cf. of oxygen per barrel is required. It should be noted, that at any of the operating temperatures employed, no coke formation was perceived.

In the aforementioned polymerization reaction process, the function of the oxygen is dependent upon the processing temperature and utilization, as hereinbefore indicated. In accordance with the above-indicated procedure, for producing a binder pitch, none of the oxygen will combine with a nonvolatile fraction. This is illustrated in Table VI, below.

TABLE VI.—COMPOSITION OF PRODUCTS

| Softening point, R&B, °F. | Oxygen, weight percent | Dell index $A^{3.3}/A^{3.4}$ | Processing conditions |
|---|---|---|---|
| 97 | 0 43 | | None. Feed stock. |
| 250 | 2 14 | 0 6 | 500° F. Example 1. |
| 237 | 1 15 | 0 7 | 600° F. Example 2. |
| 233 | 0 98 | 0 8 | 703° F. Example 3. |
| 226 | 0 46 | 0 9 | 750° F. Example 5. |
| 238 | 0 45 | 1 3 | 780° F. Example 8. |
| 261 | 0 71 | 1 3 | 1,000° F. Augusta plant-run pitch. |
| 230/240 | 0 93 | | Coal tar pitch. |

From the above table, it will be noted that under normal oxygenation or blowing conditions, (500° F.—run of Example 1) that the oxygen content of the resulting pitch product was 2.14%, by weight, as compared to 0.43%, by weight, of the charge stock. As the oxygenation or blowing temperature was increased, the oxygen content of the pitch product was found to be continually decreased. With respect to the oxygen content of the Augusta thermal asphalt, shown in Table VI, it will be noted that this asphalt had an oxygen content of 0.71%, by weight. On a comparative basis, the commercial coal tar pitch, for use as an electrode binder had an oxygen content, by weight, of 0.93%.

Referring once more to Table VI above, it will be noted that the Dell Index, which is a measure of the aromaticity of a pitch, shows the same trend. At the normal blowing temperature (500° F.), the ratio of aromatic structure (as measured by the infra-red absorbance at 3.3 microns) to aliphatic structure (as measured by the infra-red absorbance at 3.4 microns), is low. The data of Table VI, is indicative of the fact that, as the processing temperature is increased, the Dell Index is increased.

This indicates that the aliphatic part of the charge material was being removed. Furthermore, it will be noted that carrying out the polymerization process at a temperature of 780° F., is not the same as conducting the polymerization process at a temperature of 500° F. Dehydrogenation is the primary reaction occurring at 500° F., and carbon-bond cleavage is greater at 780° F. In general, in accordance with the above-indicated operable temperature range for carrying out the polymerization reaction of the present invention, it is found that by conducting such reaction above about 700° F., there is obtained a highly desirable, predominantly carbon-bond cleavage; whereas by conducting the above polymerization reaction below about 700° F., there is obtained a predominantly undesirable hydrogen-bond cleavage, which in effect, is a dehydrogenation reaction.

From the data in Table V and Table VI above, it will be noted that the physical and chemical properties of the binder pitch made by the above-described two processes, present no observable differences. The data indicates that the introduction of oxygen into the heat treatment, permits the removal of the aliphatic chains attached to the aromatic structures at significantly lower temperatures than that employed for cracking operations.

From the foregoing data and disclosure, there will be noted that the present invention makes possible the formation of improved asphaltic compositions by the treatment of asphalts derived from the thermal processing of petroleum hydrocarbons, such as are employed, for example, in the manufacture of gasolines, and which possesses wide utility in the manufacture of molded carbonaceous articles, as well as for other uses in which asphaltic materials are normally required. In combination with major quantities of carbon particles, the asphaltic compositions of the present invention are particularly useful as binders, as, for example, in the manufacture of improved carbon electrodes, possessing the above-described outstanding properties. It will be noted, however, that other asphalt charge-stocks of the type herein disclosed, may also be similarly treated in accordance with the present invention to produce the novel improved desired asphaltic compositions.

Although the present invention has been described with preferred embodiments, it will be understood that various modifications and adaptations thereof may be resorted to, without departing from the spirit and scope of the invention, as those skilled in the art will readily appreciate.

I claim:

1. An asphaltic composition obtained by polymerizing a charge-stock comprising a petroleum asphalt, derived from the thermal processing of petroleum hydrocarbons, having a specific gravity of at least about 1.1 and a benzene-insolubles content from about 0 to about 12 percent by weight, in the presence of oxygen at a rate from about 0.4 c.f.m./bbl. to about 2.7 c.f.m./bbl., and at a temperature in the range from about 750° F. to about 800° F. to produce a finished petroleum asphalt of increased specific gravity and a benzene-insolubles content from about 15 to about 35 percent by weight.

2. An asphaltic composition as defined in claim 1 wherein said charge-stock has a benzene-insolubles content of from about 0 to about 1 percent by weight and said finished petroleum asphalt has a benzene-insolubles content from about 20 to about 30 percent by weight.

3. An electrode comprising carbon particles and the asphaltic composition produced in accordance with claim 1, as a binder.

4. An electrode comprising carbon particles and the asphaltic composition produced in accordance with claim 2, as a binder.

(References on following page)

References Cited

UNITED STATES PATENTS

| | | | |
|---|---|---|---|
| 2,560,650 | 7/1951 | Kronstein | 106—273 X |
| 2,767,102 | 10/1956 | Edson | 106—273 X |
| 2,992,935 | 7/1961 | Winslow | 106—284 |
| 3,304,192 | 2/1967 | Barrett | 106—284 X |
| 3,350,295 | 10/1967 | Hamner et al. | 106—284 X |
| 3,392,104 | 7/1968 | Potts et al. | 106—273 X |
| 3,510,328 | 5/1970 | Crean | 106—273 |

FOREIGN PATENTS

| | | | |
|---|---|---|---|
| 1,135,096 | 11/1968 | Great Britain | 106—273 |

OTHER REFERENCES

Barth, Asphalt Science and Technology, N. Y. Gordon and Breach Science Publishers, 1962, pp. 400–409.

JOAN B. EVANS, Primary Examiner

U.S. Cl. X.R.

106—281 R; 208—3, 6; 252—510